United States Patent [19]

Evoy

[11] Patent Number: 5,713,030

[45] Date of Patent: Jan. 27, 1998

[54] THERMAL MANAGEMENT DEVICE AND METHOD FOR A COMPUTER PROCESSOR

[75] Inventor: David Ross Evoy, Tempe, Ariz.

[73] Assignee: VLSI Technology, Inc., San Jose, Calif.

[21] Appl. No.: 540,714

[22] Filed: Oct. 11, 1995

[51] Int. Cl.$^6$ ................................................ G06F 17/40
[52] U.S. Cl. ......................... 395/750; 340/584; 340/622; 364/492; 364/557
[58] Field of Search ..................... 395/750; 364/232.8, 364/270, 557, 492; 340/584, 588, 590, 622

[56] References Cited

U.S. PATENT DOCUMENTS

| | | | |
|---|---|---|---|
| 4,924,112 | 5/1990 | Anderson et al. | 307/270 |
| 4,970,497 | 11/1990 | Broadwater et al. | 340/598 |
| 5,230,055 | 7/1993 | Katz et al. | 395/750 |
| 5,287,292 | 2/1994 | Kenny et al. | 364/550 |
| 5,451,892 | 9/1995 | Bailey | 327/43 |
| 5,502,838 | 3/1996 | Kikinis | 395/550 |

Primary Examiner—Jack B. Harvey
Assistant Examiner—Ario Etienne
Attorney, Agent, or Firm—Hickman, Beyer & Weaver

[57] ABSTRACT

A thermal management device for controlling the temperature of a computer processor chip, by controlling the operating speed of the processor, including a temperature sensitive circuitry incorporated within a packaged clock chip for connection to a processor. A thermal management method for controlling the temperature of a computer processor chip includes sensing a temperature with a temperature dependent circuitry integrally formed in a packaged clock chip, in which the sensed temperature is a function of the temperature of the computer processor chip, generating a clock control signal with the temperature dependent circuitry and sending the clock control signal to a clock generator also integrally formed in the clock chip, and sending a clock signal from the clock generator to the computer processor chip in order to control the operating frequency, and thus the temperature, of the processor.

22 Claims, 4 Drawing Sheets

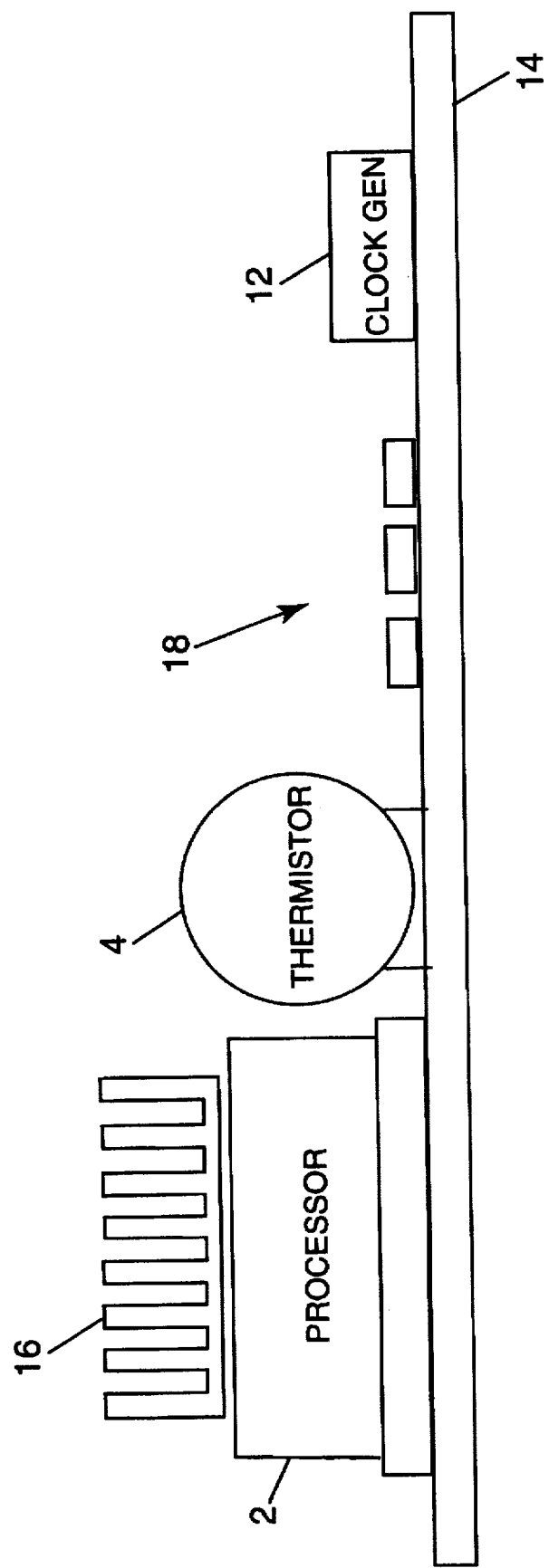
FIGURE 2 *(Prior Art)*

THERMAL MANAGEMENT DEVICE AND METHOD FOR A COMPUTER PROCESSOR

BACKGROUND OF THE INVENTION

The present invention relates generally to a thermal management device and method for a computer microprocessor ("processor"). More particularly, an active thermal management device associated with the central processing unit or processor of a digital computer, for controlling the operating speed of the processor as a function of its dynamic temperature state, is disclosed.

Thermal design of electronic components is currently aimed at preventing thermally induced physical failures of the components, by reducing the temperature rise of the components and/or by minimizing the temperature variations within the components. A processor of a digital computer is known to heat-up when the digital computer is operating, and generally, the temperature of the processor is higher when the processor operates at higher frequencies.

As digital computer design aims to achieve higher and higher processor operating speeds by increasing the frequency of the processor clock, adequate thermal management systems must be simultaneously provided to limit the processor temperatures thereby to insure reasonable useful lives and/or non failures of the processors. Processors such as the Pentium® processor by Intel typically generate 8 Watts of power (dissipated primarily as heat) during floating point peak operating conditions. Conventional cooling systems for the processors include sufficiently large and/or efficient fans for generating a convective cooling air flow over the processor and sufficiently efficient heat sinks arranged near the processor for effectively dissipating the heat given off by the processor. These systems must generally be designed for the worst case situation in which the processor operates at it highest speeds and generates its greatest amount of heat. However, the processor usually operates at its highest speeds only at relatively short and infrequent intervals, and therefore these conventional cooling systems are generally over-designed for the typical case (when the processor is not operating at its highest peak speed) so as to handle in particular the worst-case scenario.

Alternatively, active systems are known for controlling the processor operating speed so as to control (limit) the temperature of the processor. FIG. 1 schematically shows a known active thermal control system. Arranged in proximity to a digital computer processor 2, is a thermistor 4, or other passive or semiconductor device whose electrical resistance is dependent upon temperature. The thermistor 4 is connected in one branch of a voltage divider with a resistor R1, where the voltage divider produces a variable voltage at its central node that is connected to an input of a comparator 6. The comparator 6 is often an operational amplifier (OP AMP) with positive feedback, or Schmitt trigger, for producing a digital output over-temperature signal 8 which indicates if the variable voltage signal produced by the voltage divider and sent into the non inverting (+) input of the comparator reaches or exceeds a predetermined value. The thermistor-comparator circuitry provides a binary output signal 8 which is indicative of the dynamic temperature state of the processor (i.e. too hot or sufficiently cool). A power management unit 10 can then adjust a clock signal provided to a clock generator 12, which creates the system clock for the processor 2.

FIG. 1A shows one example of an output over-temperature signal 8 as a function of the temperature of the processor. A low output over-temperature signal indicates that the temperature of the processor has reached or exceeded a predetermined value (in this case around 57° C. for processor heating up and 53° C. for processor cooling down). The essentially binary output over-temperature signal 8 of FIG. 1A is obtained when the components of the comparator/thermistor circuitry of FIG. 1 are as follows: R2 and R3=100K ohms; Rf=1 Meg ohm; R4=5K ohm; Vref=+5 volts; R1=40K ohm; thermistor 4 is an NTC thermistor PNT123 available from the Panasonic Corporation facility in Cypress, Calif. and comparator 6 is ¼ of a LM339 comparator available from National Semiconductor of San Jose, Calif. When R1=150K ohm and all other components of the comparator/thermistor circuitry remain unchanged, an over-temperature signal changes between high and low around a temperature of about 25° C., while when R1=25K ohm and all other components remain unchanged, the over-temperature signal changes between high and low around a temperature of about 60° C. As noted, there is a slight hysteresis loop involved in the shift in the over-temperature signal, depending upon whether the temperature is changing from acceptable to too high, or is changing from too high to acceptable.

The output over-temperature signal 8 is sent to a power management unit 10 which is in turn connected to a clock generator 12. The power management unit 10 includes generally one output (thermal output) to the clock generator 12 which is typically a two-speed clock generator. The thermal output to the clock generator 12 from the power management unit 10 will control the clock generator 12 to operate at one of its two speeds, either fast or slow. The power management unit further includes, most commonly for laptop computers where power consumption is an important design consideration, additional outputs (typically 15 to 20 power management outputs) for sending software generated signals directly to the processor for controlling the processor speed dependent upon the power consumption of the processor or of the computer incorporating the processor. Unforeseen downtimes or "crashes" of the power management unit 10 could lead to dangerous thermal runaway of the computer processor 2 due to the lack of proper processing on the part of the non-operating power management unit of the over-temperature signal 8.

FIG. 2 shows the thermal control system of FIG. 1, with various system components connected to a printed circuit board 14. A heat sink 16 arranged near the processor 2 is provided for dissipating heat from the processor, while the thermistor 4 is arranged near the processor 2. The reference numeral 18 indicates various elements on the printed circuit board including the comparator circuit 6. One problem which exists with the thermal control system of FIG. 2 resides in the complications involved in physically connecting in the circuit board 14 the thermistor circuit to the comparator 6, the comparator 6 to the clock generator 12, and the clock generator 12 to the processor 2. A more important issue is the increased parts count. This increases failure rate, inventory costs, assembly errors, and testing requirements. Therefore, providing the arrangement of FIG. 2 of the various thermal control system components on the printed circuit board 14 is a relatively time consuming and costly task. Moreover, the arrangement of the components is such as to take up large spaces on the printing circuit board 14.

Another known system for controlling the processor operating speed in order to control the processor temperature consists in observing the type and/or amount of instructions which the processor has been given to process, and then attempting to deduce the processor temperature based upon these observations. However, success in this area has been generally limited since a precise determination of the processor temperature, which would allow to operate the processor at its truly maximum speeds while simultaneously avoiding processor failure, has not been found.

What is needed is a thermal management device and method which effectively controls the temperature state of a digital computer processor while allowing the processor to safely operate at its highest speeds, and which is extremely reliable in use and uncomplicated and inexpensive to industrialize.

SUMMARY OF THE INVENTION

In one embodiment of the invention, a computer processor active thermal management system is provided, which includes a packaged integrated circuit computer processor chip arranged on a printed circuit board, and a separately packaged integrated circuit clock chip also arranged on the printed circuit board and coupled to the processor for controlling the frequency of operation of the processor. The clock chip has a temperature sensing circuitry included integrally therein which is adapted for providing a clock control signal which is a function of a temperature sensed by the temperature sensing circuitry. The clock chip further includes a clock generator integrated therein which is adapted for providing a clock signal to the computer processor chip. The clock generator receives the clock control signal from the temperature sensitive circuitry such that the clock signal produced by the clock generator is a function of the clock control signal received from the temperature sensitive circuitry. A thermal coupling is formed between the clock chip and the computer processor chip for communicating the temperature sensed by the temperature sensing device as a function of the computer processor chip temperature. In this manner, the clock generator chip directly senses the temperature of the computer processor chip. According to this aspect of the invention, a prepackaged clock chip may positioned directly adjacent a prepackaged computer processor chip on a printed circuit board, easily and in an uncluttered arrangement, in order to effectively and efficiently obtain a direct frequency control and thermal management of the computer processor.

In a method aspect of the invention, an active thermal management method for controlling the temperature of a packaged computer processor chip adapted to operate at a variable frequency is provided, which in one preferred embodiment includes the steps of sensing a temperature which is a function of the temperature of the computer processor chip with a temperature dependent circuitry integrally formed in a packaged clock chip, generating a clock control signal dependent upon the sensed temperature by means of the temperature dependent circuitry, sending the clock control signal to a clock generator which is also integrally formed in the clock chip, generating a clock signal dependent upon the clock control signal by means of the clock generator, and sending the clock signal to the computer processor chip thereby to control its operating frequency and hence its temperature.

According to another embodiment of the invention, there is provided an active thermal management system including a packaged computer processor chip adapted for operating at variable frequency, and a separately packaged clock chip having a temperature sensitive circuitry and a clock generator both integrated therein. The temperature sensitive circuitry is operative to produce a clock control signal dependent upon a temperature sensed by the temperature sensitive circuitry, and the clock generator is connected with the temperature sensitive circuitry for receiving the clock control signal therefrom such that the clock generator is operative to produce a clock signal dependent upon the clock control signal. The computer processor chip is connected with the clock generator for receiving the clock signal therefrom for controlling the frequency of operation of the computer processor, and a thermal coupling is provided between the computer processor chip and the clock chip for communicating a temperature state of the computer processor chip to the temperature sensitive circuitry of the clock chip.

In a further aspect of the invention, a thermal management device for a computer processor is provided in the form of a packaged integrated circuit clock chip operative to send a clock signal to a separately packaged computer processor chip for controlling its operating frequency. The packaged clock chip comprises a temperature sensitive circuitry integrally formed in the packaged clock chip and operative to generate a clock control signal which is a function of a temperature sensed thereby, and a clock generator integrally formed in the packaged clock chip and operative to generate the clock signal. The clock generator is coupled to the temperature sensitive circuitry for receiving the clock control signal therefrom such that the clock signal is a function of the clock control signal. According to one preferred embodiment, the temperature sensitive circuitry includes a comparator circuit and a thermistor circuit operative to send a variable voltage signal dependent upon the sensed temperature to the comparator circuit, which is in turn operative to send the clock control signal as a digital output signal dependent upon the variable voltage signal to the clock generator circuitry.

A packaged clock chip according to the invention may directly sense the temperature of a separately packaged computer processor chip for efficiently obtaining a direct frequency control and thermal management of the computer processor. A packaged clock chip according to the invention may be easily coupled with a computer processor chip, for example on a printed circuit board in a cost effective manner by minimizing space and connection requirements. In a preferred embodiment, the clock chip with an integrated temperature sensitive circuitry is directly connected to a computer processor such as to be software independent by providing a complete hardware connection which is not susceptible to software failure. Simultaneously, the invention is fully compatible with conventional software driven power management schemes for controlling the processor speed based upon power consumption criteria.

BRIEF DESCRIPTION OF THE DRAWINGS

The invention, together with further advantages thereof, may best be understood by reference to the following description taken in conjunction with the accompanying drawings in which:

FIG. 2 is an elevation side view showing the physical components of the system of FIG. 1;

DESCRIPTION OF THE PREFERRED EMBODIMENTS

Figure 1:
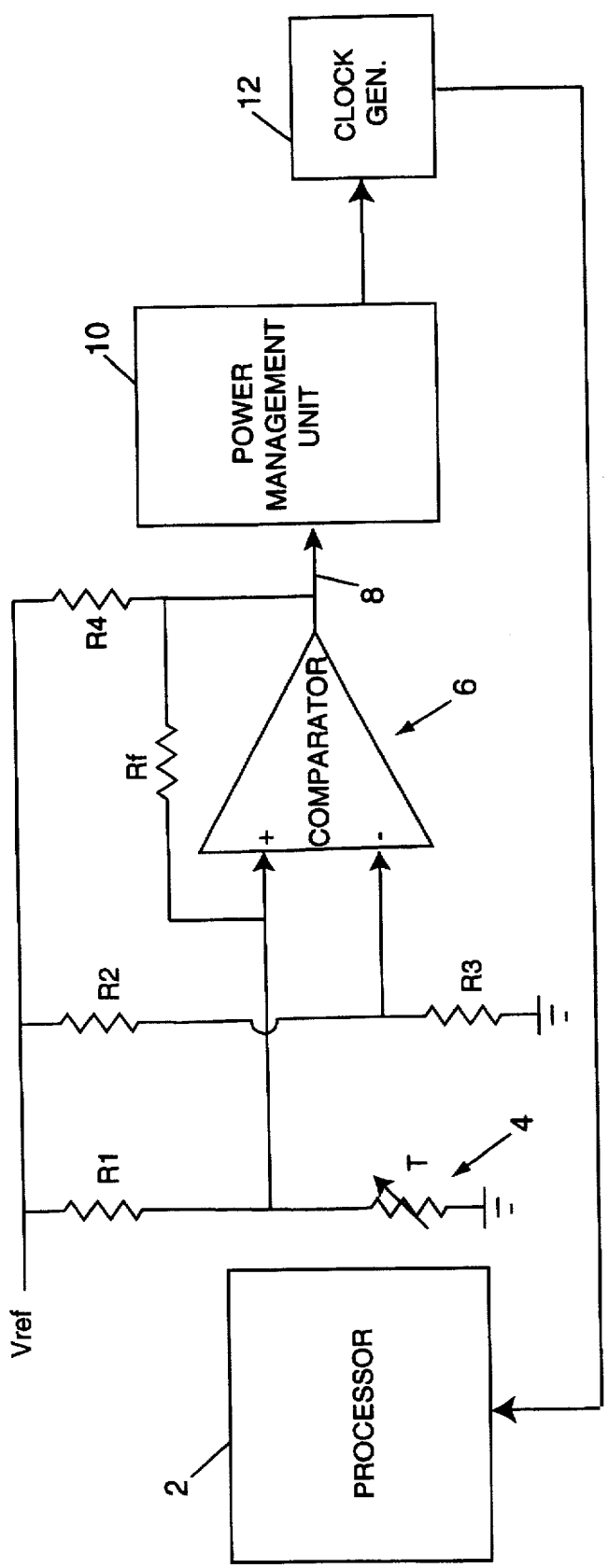
FIG. 1 is a schematic view of a known thermal control system for controlling the temperature of a computer processor.
Figure 3:
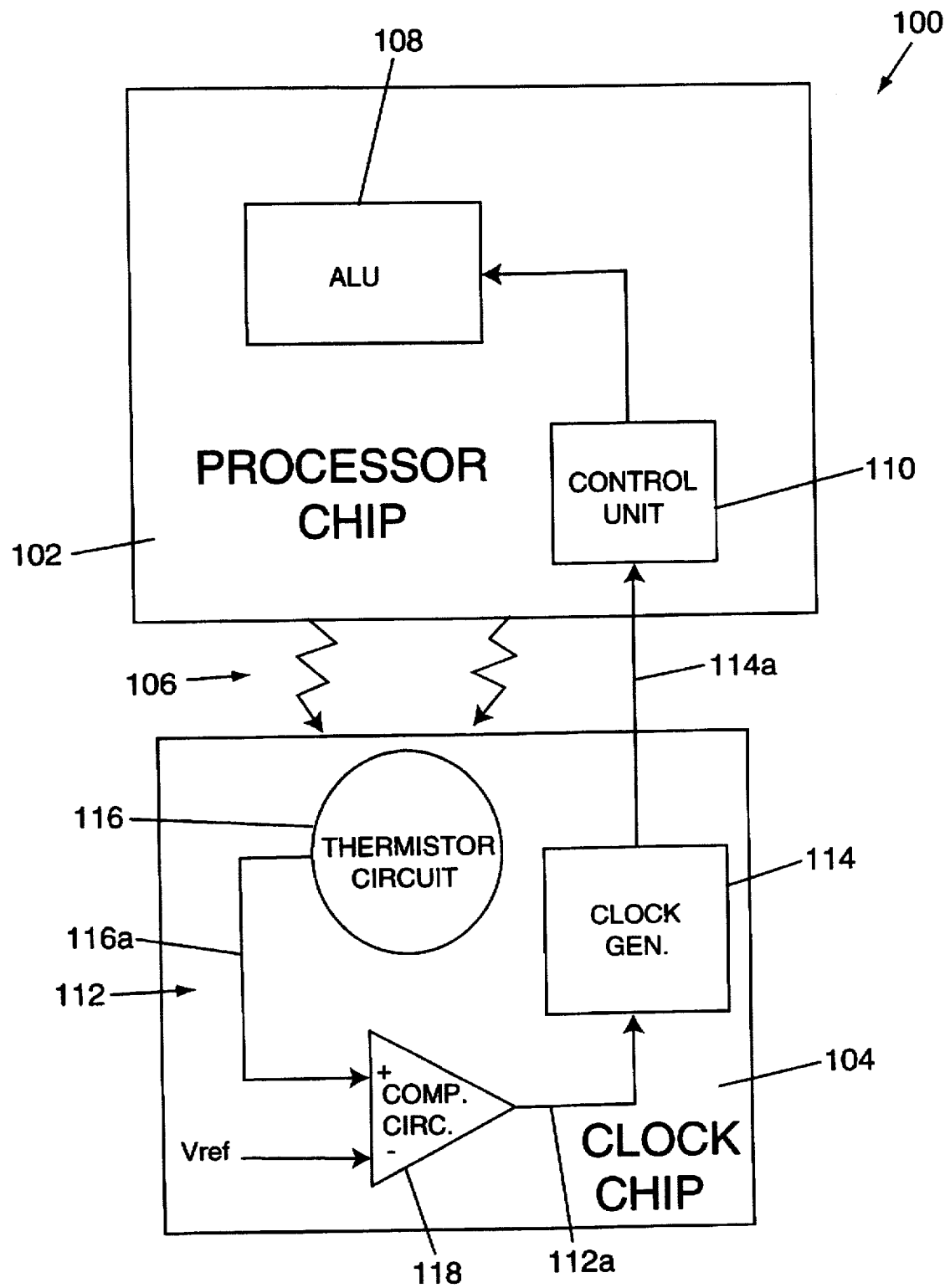
FIG. 3 is a schematic view of one preferred embodiment of an active thermal management system according to the present invention.

FIG. 1 schematically shows a known active thermal control system and FIG. 2 shows the components of the system of FIG. 1, as described previously. With reference to FIG. 3, a preferred embodiment of an active thermal management system 100 in accordance with the present invention includes a packaged computer processor chip 102, a packaged clock chip 104, and a thermal coupling 106 between computer processor chip 102 and clock chip 104. Thermal coupling 106 is such as to communicate a temperature state of computer processor chip 102 to clock chip 104. Thermal coupling 106 may be embodied in various forms, some of which will be described hereinafter.

Computer processor chip 102 and clock chip 104 are separately packaged chips. Preferably, processor chip 102 is a packaged integrated circuit (IC) processor chip which includes arithmetic and logic circuits (ALU) 108 in conjunction with main control circuits (control unit) 110. Control unit 110 provides organized synchronous coordination of the operation of processor chip 102 and possibly of other functional units connected with processor chip 102 such as I/O devices and memory. Processor chip 102 is adapted for receiving instructions (usually fetched from memory) and executing instructions. Processor chip 102 is able to operate at a variable frequency and therefore the instructions may be received and executed relatively quickly or relatively slowly depending upon the frequency of operation. As will be more fully described below, processor chip 102 is coupled with clock chip 104 such that control unit 110 is operative to receive a clock signal from clock chip 102 in order to control the operating frequency of processor chip 102. Control unit 110 of processor 102 provides control signals in order to sequentially execute instructions in ALU 108 of processor 102. Processor chip 102 may be, for example, a Pentium® processor chip of Intel corporation, or any other type of microprocessor made by a variety of manufacturers.

Clock chip 104 according to the invention is a packaged integrated circuit clock chip which includes a temperature sensitive or dependent circuitry 112 and a clock generator 114 both formed integrally in packaged clock chip 104. Temperature sensitive circuitry 112 is operative to generate a clock control signal 112a which is dependent upon, or a function of, a temperature sensed by temperature sensitive circuitry 112. Clock generator 114 is coupled to temperature sensitive circuitry 112 so as to receive clock control signal 112a, and clock generator 114 is operative to generate a clock signal 114a which is dependent upon, or a function of, clock control signal 112a. Clock generator 114 therefore has an input for receiving clock control signal 112a from temperature sensitive circuitry 112 and an output for sending clock signal 114a to control unit 110 of processor chip 102 for controlling the frequency of operation of processor chip 102.

Thermal coupling 106 between clock chip 104 and processor chip 102 allows for the temperature sensed by temperature sensitive circuitry 112 of clock chip 104 to be a predetermined function of the temperature state of processor chip 102. The temperature state of processor chip 102 is communicated to temperature sensitive circuitry 112 of clock generator chip 104 by means of thermal coupling 106. When the temperature sensed by circuitry 112 is too high (beyond a pre-determinable limit depending upon the processor type and thermal coupling type), clocking signal 114a produced by clock chip 104 is such as to instruct control unit 110 to slow down the frequency of operation of processor chip 102, which allows processor chip 102 to cool down. The signal 114a is therefore a variable system clock, which may be used directly or can be multiplied or divided by a suitable factor, as is well known to those skilled in the art. When the temperature sensed by circuitry 112 is not beyond a temperature threshold for safe operation of processor chip 102, temperature sensitive circuitry 112 will not cause clock chip 104 to produce a slow clocking signal 114a but, rather, the clock signal 114a will be at the maximum clock rate. A determination of the correct temperature threshold which ensures a non-destructive operation of processor chip 102 may be found using either mathematical modeling based upon factors such as processor chip type, clock chip type, and thermal coupling type, or empirical testing, as will be appreciated by those skilled in the art.

Packaged integrated circuit clock chip 104 constitutes a thermal management device for controlling the operating frequency and temperature of separately packaged computer processor chip 102. According to the invention, a method for controlling the temperature of processor chip 102 includes sensing a temperature with temperature sensitive circuitry 112 of clock chip 104, which sensed temperature is a function of the temperature state of processor chip 102. Clock control signal 112a, dependent upon the sensed temperature, is subsequently generated by circuitry 112 and sent to clock generator 114, which in turn generates clock signal 114a dependent upon clock control signal 112a. Clock signal 114a is then sent to control unit 110 of processor chip 102 so as to control the operating frequency, and hence the temperature, of processor chip 102.

Figure 1A:
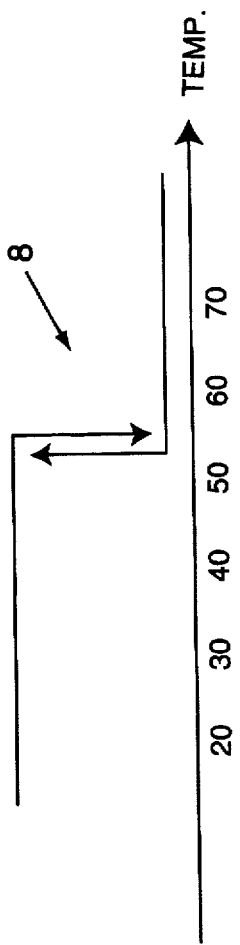
FIG. 1A shows an example of an output over-temperature signal produced in the thermal control system of FIG. 1.

Still with reference to FIG. 3, according to one preferred embodiment of the invention, temperature sensitive circuitry 112 includes a thermistor circuit 116 and a comparator circuit 118. Thermistor circuit 116 may be equivalent to the thermistor circuitry discussed previously with reference to FIG. 1, so that a variable voltage signal 116a is generated by thermistor circuitry 116 as a function of the temperature sensed by thermistor circuit 116. Comparator circuit 118 may also be equivalent to the comparator circuitry discussed previously with reference to FIG. 1, so that clock control signal 112a is generated by comparator circuit 118 which is similar to the over-temperature signal of FIG. 1A, therefore in the form of a digital output signal and dependent upon variable voltage signal 116a. Clock generator 114 is preferably a two-speed clock generating circuit which will generate one of two frequencies causing processor 102 to operate at one of two speeds. Clock chip 104 may alternatively be such as to allow control unit 110 of processor chip 102 to operate at one of a plurality of speeds, as will be appreciated by those skilled in the art. For example, the comparison circuit 118 can be replaced with an operational amplifier (OP AMP) and the clock generator 114 can be replaced with a voltage controlled oscillator (VCO), along with appropriate interconnection circuitry, to accomplish this result.

Figure 4:
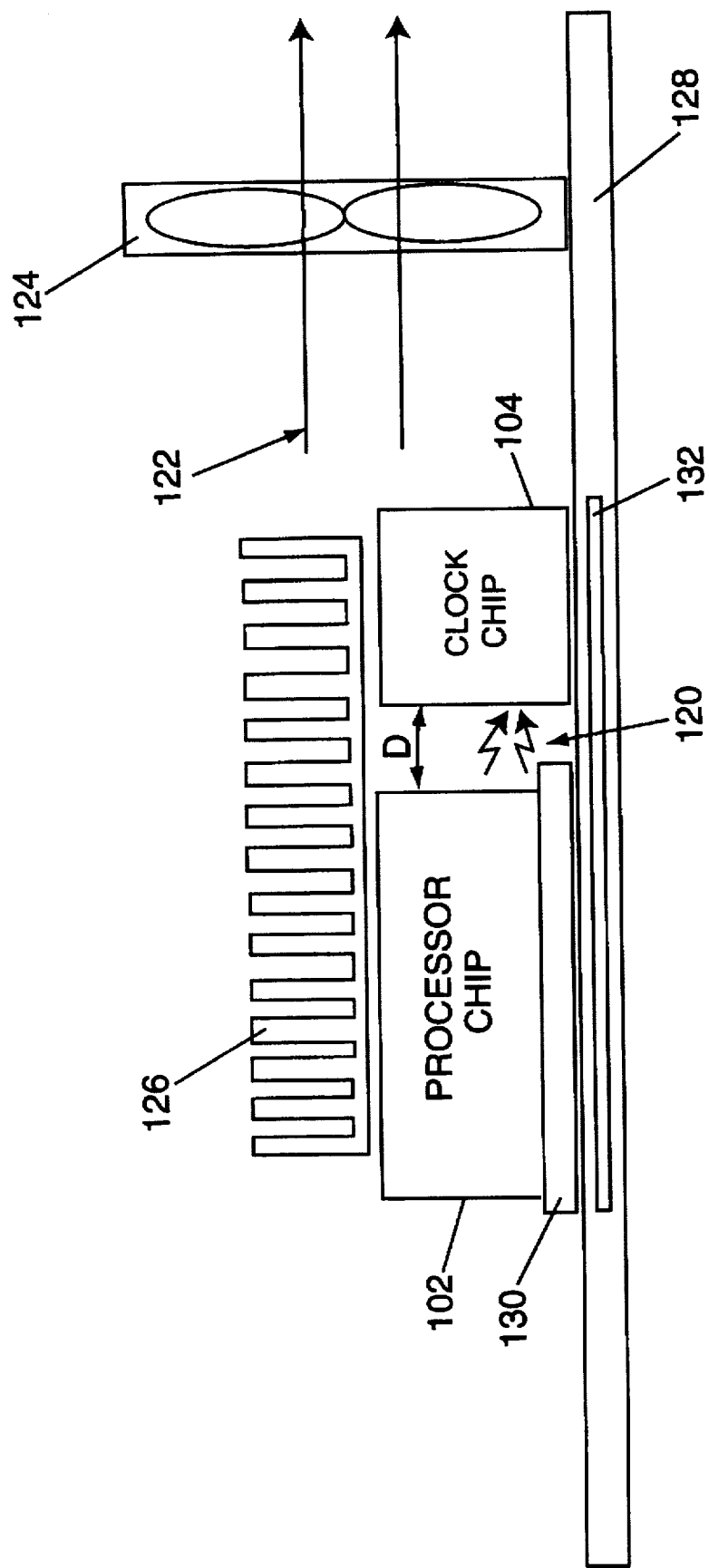
FIG. 4 is an elevation side view showing some embodiments of physical components of the active thermal management system of FIG. 3.

FIG. 4 illustrates a variety of some preferred embodiments of thermal coupling 106 according to the invention arranged between processor chip 102 and clock chip 104. Thermal coupling 106 may include a spatial arrangement between processor chip 102 and clock chip 104 such as to define a distance D between processor chip 102 and clock chip 104 defining a path for heat 120 generated by the processor chip 102. Heat flow 120 between processor chip 102 and clock chip 104 represents a temperature state of processor chip 102 which is detectable by the temperature sensitive circuitry integrated in clock chip 104. Thermal coupling 106 may also include an air flow 122, generated for example by means of a fan device 124. Air flow 122 is such as to flow over processor chip 102 and over clock chip 104 so that clock chip 104 is arranged downstream in air flow 122 with respect to processor chip 102. In this case, heat flow 120 between processor chip 102 and clock chip 104 is dependent upon the type of air flow 122 generated by fan device 124.

Thermal coupling 106 may also include a heat sink element 126 arranged in proximity to both processor chip 102 and clock chip 104. Heat sink element 126 is primarily used to effectively dissipate heat generated by processor chip 102, however by extending over both processor chip 102 and clock chip 104 as seen in FIG. 4, clock chip 104 is capable of sensing a temperature of heat sink element 126 which is functionally dependent upon the temperature state of processor chip 104. Furthermore, any type of connector element, preferably made of metal, may be interconnected between processor chip 102 and clock chip 104, such that the temperature of the connector element may be sensed by clock chip 104. A functional relationship between the temperature of the connector element and processor chip 102 would exist in order to allow clock chip to sense the temperature state of processor chip 102.

As seen in FIG. 4, a printed circuit board 128 may be employed for supporting processor chip 102, clock chip 104, and fan device 124. Processor chip 102 may be connected to printed circuit board 128 by means of a conventional socket 130 which allows for easy replacement or substitution of processor chip 102. Thermal coupling 106 may include a metal connector element 132 provided in circuit board 128 and interconnected between processor chip 102 and clock chip 104 such that the temperature of connector element 132 may be sensed by clock chip 104, and thus the temperature state of processor chip 102 may be determined. Thermal coupling may also include conventional metal ground traces in circuit board 128 employed such that clock chip may sense the temperature state of processor 102. As will be apparent to those skilled in the art, many types of arrangements may be used to form thermal coupling 106 between processor chip 102 and clock chip 104 so as to communicate the temperature state of processor chip 102 to the temperature sensitive circuitry integrated in clock chip 104. As discussed above, a determination of the correct temperature threshold which ensures a non-destructive operation of processor chip 102 may be found using mathematical modeling based upon factors such as processor chip type, clock chip type, and thermal coupling type, or by using direct empirical testing.

It should be understood that the present invention may be embodied in many other specific forms without departing from the spirit or scope of the invention. For instance, although the specification has described controlling the temperature of a computer processor chip including a control unit packaged and integrated therein, it is envisioned that the invention will perform well for controlling the temperature of a processor chip which does not include an internal control unit. In this case a control unit external to the processor chip would receive clock signal 114a and pass on control signals to the processor chip which would still be coupled to temperature sensitive circuitry 112 for example by thermal coupling 106. The present description is therefore to be considered as illustrative and not restrictive, and the invention is not to be limited to the details given herein, but may be modified within the scope of the appended claims.

What is claimed is:

1. An active thermal management system comprising:
   a packaged computer processor chip adapted for operating at variable frequency;
   a separately packaged clock chip having a temperature sensitive circuitry and a clock generator both integrated therein, said temperature sensitive circuitry being operative to produce a clock control signal dependent upon a temperature sensed by said temperature sensitive circuitry, said clock generator being connected with said temperature sensitive circuitry for receiving said clock control signal therefrom, said clock generator being operative to produce a clock signal dependent upon said clock control signal from said temperature sensitive circuitry, said computer processor chip being connected with said clock generator for receiving said clock signal therefrom for controlling the frequency of operation of the computer processor, said packaged clock chip being positioned adjacent to said packaged computer processor chip, but not in physical contact with said packaged computer processor chip, such that said packaged clock chip is thermally influenced by at least a portion of a heat energy generated by said packaged computer processor chip; and
   a thermal coupling positioned between said computer processor chip and said clock chip said thermal coupling being capable of transferring at least a portion of said heat energy to said temperature sensitive circuitry of said clock chip so as to thermally influence said clock chip.

2. The active thermal management system of claim 1, wherein said temperature sensitive circuitry comprises a comparator circuit and a thermistor circuit for providing a variable voltage signal to said comparator circuit, said comparator circuit being adapted for sending said clock control signal dependent upon said variable voltage signal, said clock control signal being a digital output signal.

3. The active thermal management system of claim 2, wherein said clock generator has an input for receiving said digital output signal from said comparator circuit and an output for sending said clock signal to said computer processor chip.

4. The active thermal management system of claim 3, wherein said computer processor chip comprises a control unit integrally formed in said computer processor chip, said control unit being operative to receive said clock signal from said clock generator.

5. The active thermal management system of claim 1, wherein said thermal coupling comprises a spatial arrangement between said computer processor chip and said clock chip so as to define a minimized heat flow distance between said computer processor chip and said clock chip.

6. The active thermal management system of claim 1, wherein said thermal coupling comprises a flow of air over said computer processor chip and over said clock chip which is arranged downstream in said flow of air with respect to said computer processor chip.

7. The active thermal management system of claim 1, wherein said thermal coupling comprises a heat sink element arranged in proximity to both said computer processor chip and said clock chip.

8. The active thermal management system of claim 1, wherein said thermal coupling comprises a metal connector between said computer processor chip and said clock chip.

9. An active thermal management method for controlling the temperature of a packaged computer processor chip adapted to operate at a variable frequency, comprising the steps of:

positioning a packaged clock chip adjacent to a packaged computer processor chip, but not in physical contact with said packaged computer processor chip, where said packaged clock chip includes both a temperature sensitive circuitry and a clock generator, such that said packaged clock chip is thermally influenced by a temperature state of said packaged computer processor chip;

sensing a temperature with said temperature dependent circuitry, said temperature being a function of the temperature of said computer processor chip;

generating a clock control signal from an output of said temperature dependent circuitry, said clock control signal being dependent upon said temperature sensed by said temperature dependent circuitry;

sending said clock control signal to said clock generator;

generating a clock signal with said clock generator, said clock signal being dependent upon said clock control signal; and sending said clock signal to said computer processor chip to control the operating frequency of said computer processor chip so as to control the temperature of said computer processor chip.

10. The method of claim 9, including sensing said temperature with a thermistor circuit and generating a variable voltage signal with said thermistor circuit, said variable voltage signal being a function of said sensed temperature.

11. The method of claim 10, further including sending said variable voltage signal to a comparator circuit and generating said clock control signal with said comparator circuit, wherein said clock control signal is a digital output signal.

12. The method of claim 11, including sending said clock signal to a control unit integrally formed in said computer processor chip.

13. A computer processor active thermal management system comprising:

a packaged integrated circuit computer processor chip arranged on a printed circuit board, said computer processor chip being adapted for operating in a range of frequencies;

a separately packaged integrated circuit clock chip arranged on said printed circuit board and coupled to said computer processor chip, said clock chip having a temperature sensing circuitry included integrally therein and adapted for providing a clock control signal which is a function of a temperature sensed by said temperature sensing circuitry, said clock chip further having a clock generator included integrally therein and adapted for providing a clock signal to said computer processor chip for controlling the operating frequency of said computer processor chip, said clock generator being coupled with said temperature sensitive circuitry for receiving said clock control signal therefrom such that said clock signal is a function of said clock control signal, said packaged clock chip being positioned adjacent to said packaged computer processor chip, but not in physical contact with said packaged computer processor chip, such that said packaged clock chip is thermally influenced by a temperature state resulting in part from a heat energy generated by said packaged computer processor chip of said packaged computer processor chip; and a thermal coupling formed between said clock chip and said computer processor chip for providing at least a portion of said heat energy to said temperature sensing circuitry within said clock chip.

14. The computer processor active thermal management system of claim 13, wherein said temperature sensing circuitry comprises a comparator circuit and a thermistor circuit connected to said comparator circuit.

15. The computer processor active thermal management system of claim 13, wherein said thermal coupling comprises a spatial arrangement on the printed circuit board between said computer processor chip and said clock chip so as to define a distance between said computer processor chip and said clock chip for a detectable flow of heat between said computer processor chip and said clock chip through said distance.

16. The computer processor active thermal management system of claim 13, further comprising a device for creating an air flow, and wherein said thermal coupling comprises said air flow provided over said computer processor chip and over said clock chip which is arranged downstream in said air flow with respect to said computer processor chip.

17. The computer processor active thermal management system of claim 13, wherein said thermal coupling comprises a heat sink element arranged in proximity to both said computer processor chip and said clock chip.

18. The computer processor active thermal management system of claim 13, wherein said thermal coupling comprises a metal connector provided in said circuit board and interconnected between said computer processor chip and said clock chip.

19. A packaged integrated circuit clock chip operative to send a clock signal to a separately packaged computer processor chip for controlling the operating frequency of the computer processor chip, the clock chip comprising:

a temperature sensitive circuitry integrally formed in said packaged clock chip, said temperature sensitive circuitry being operative to generate a clock control signal which is a function of a temperature sensed by said temperature sensitive circuitry, a clock generator integrally formed in said packaged clock chip, said clock generator being operative to generate said clock signal, said clock generator being coupled to said temperature sensitive circuitry for receiving said clock control signal therefrom such that said clock signal is a function of said clock control signal;

whereby said temperature sensitive circuitry and said clock generator share a common substrate a common package, responsive to a temperature of an ambient environment surrounding said common package.

20. The clock chip of claim 19, wherein said temperature sensitive circuitry comprises a comparator circuit and a thermistor circuit operative to send a variable voltage signal dependent upon said sensed temperature to said comparator circuit.

21. The clock chip of claim 20, wherein said comparator circuit is operative to send said clock control signal to said clock generator, said clock control signal being a digital output signal dependent upon said variable voltage signal.

22. The clock chip of claim 21, wherein said clock generator has an input for receiving said digital output signal from said comparator circuit and an output for sending said clock signal to said computer processor chip.

* * * * *